INVENTORS
SMITH M. JOHNSON &
JOHN A. FARMWALD
BY

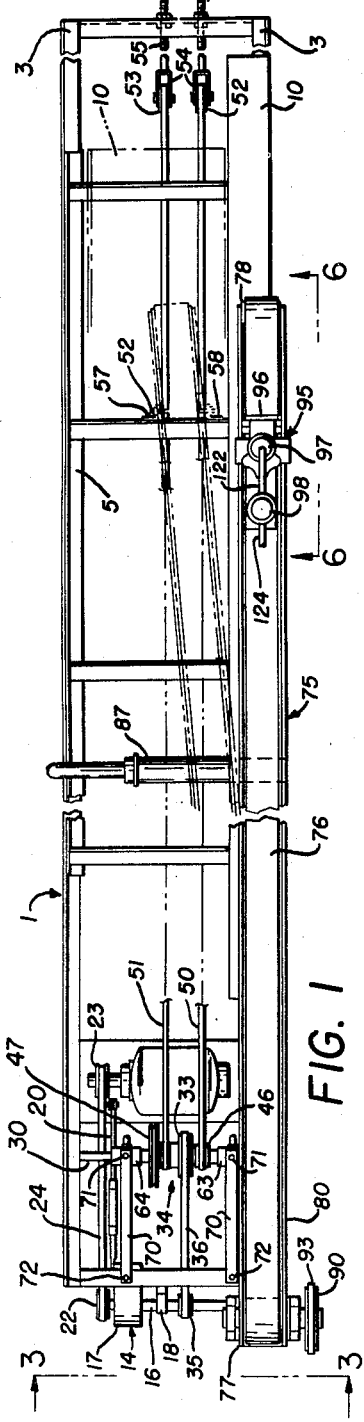

ATTORNEY

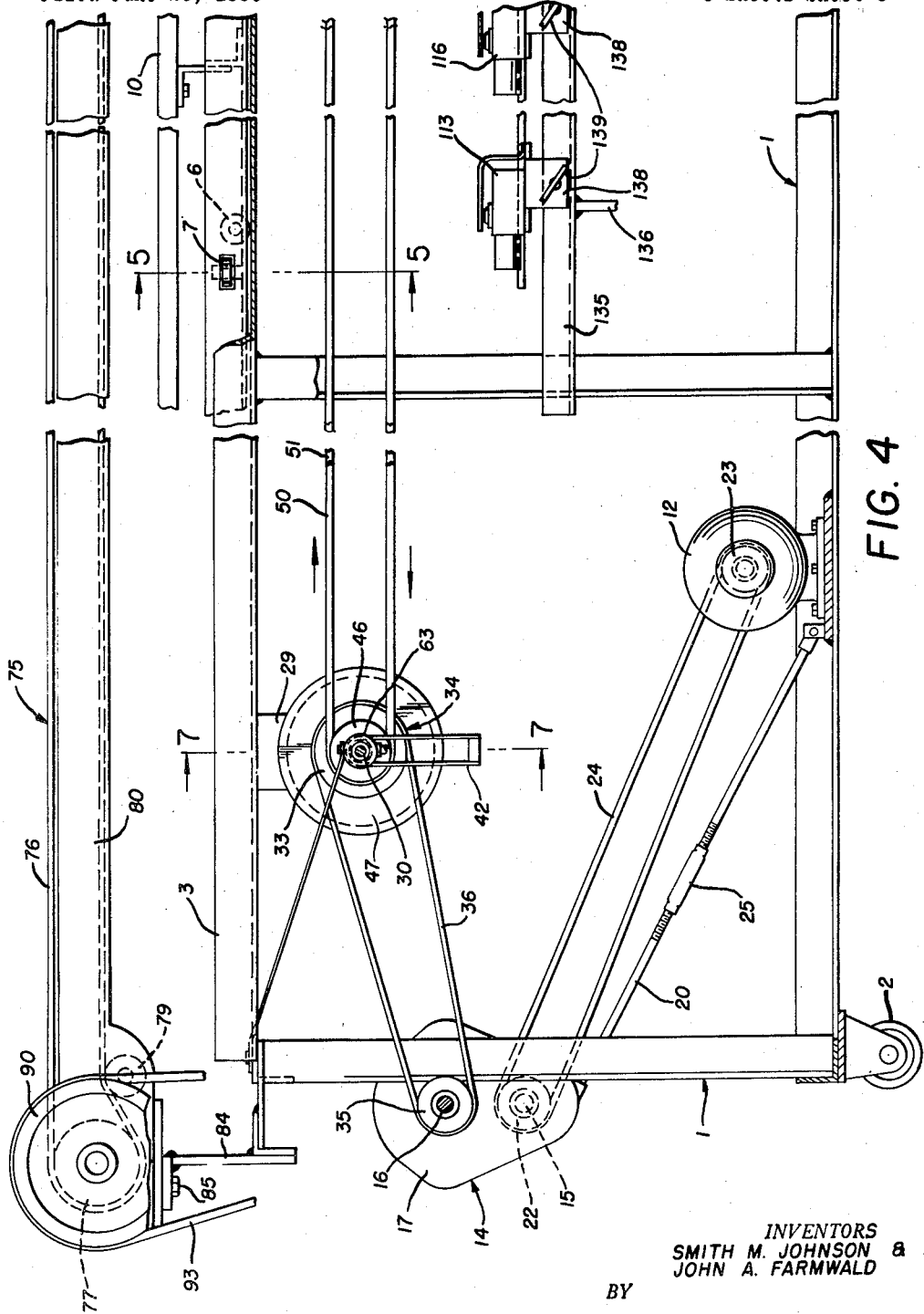

INVENTORS
SMITH M. JOHNSON &
JOHN A. FARMWALD
BY
ATTORNEY

Aug. 16, 1960  S. M. JOHNSON ET AL  2,949,034
CARRIAGE RECIPROCATING MECHANISM
Filed June 26, 1956  8 Sheets-Sheet 5

INVENTORS
SMITH M. JOHNSON &
JOHN A. FARMWALD
BY
ATTORNEY

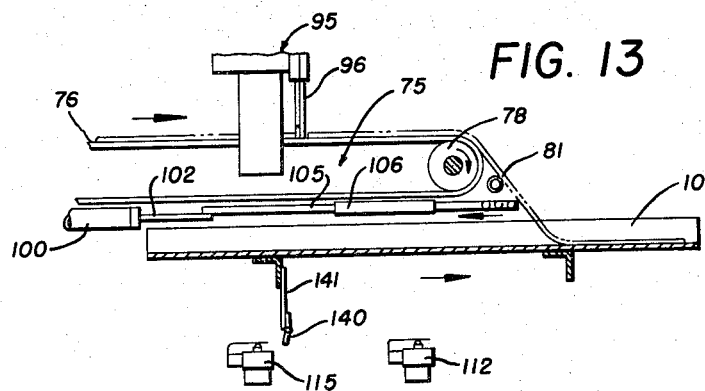
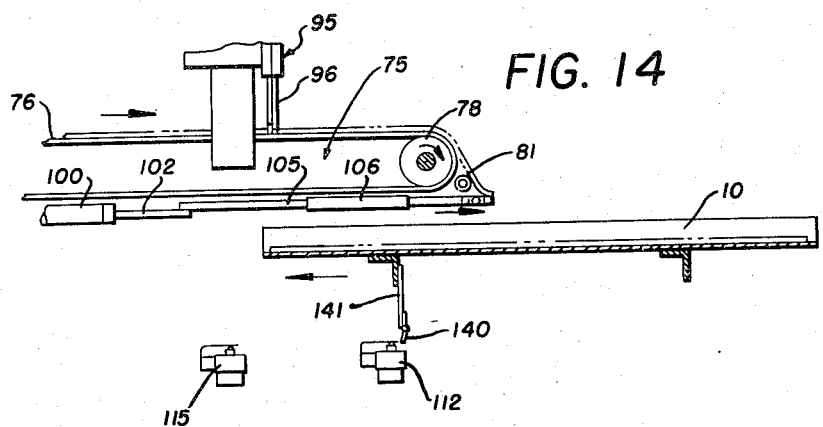
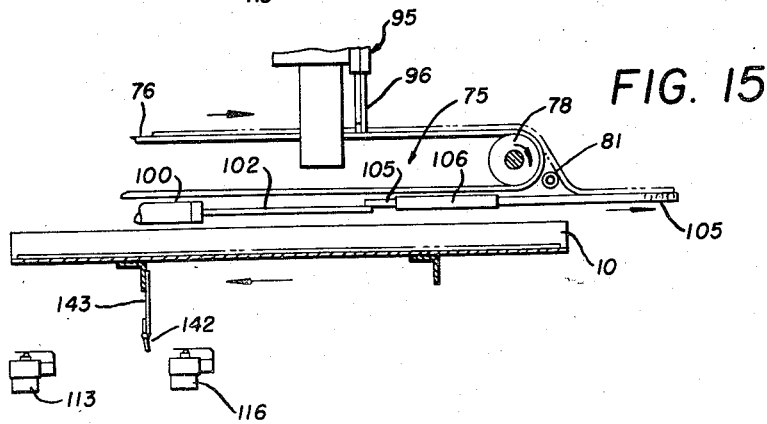

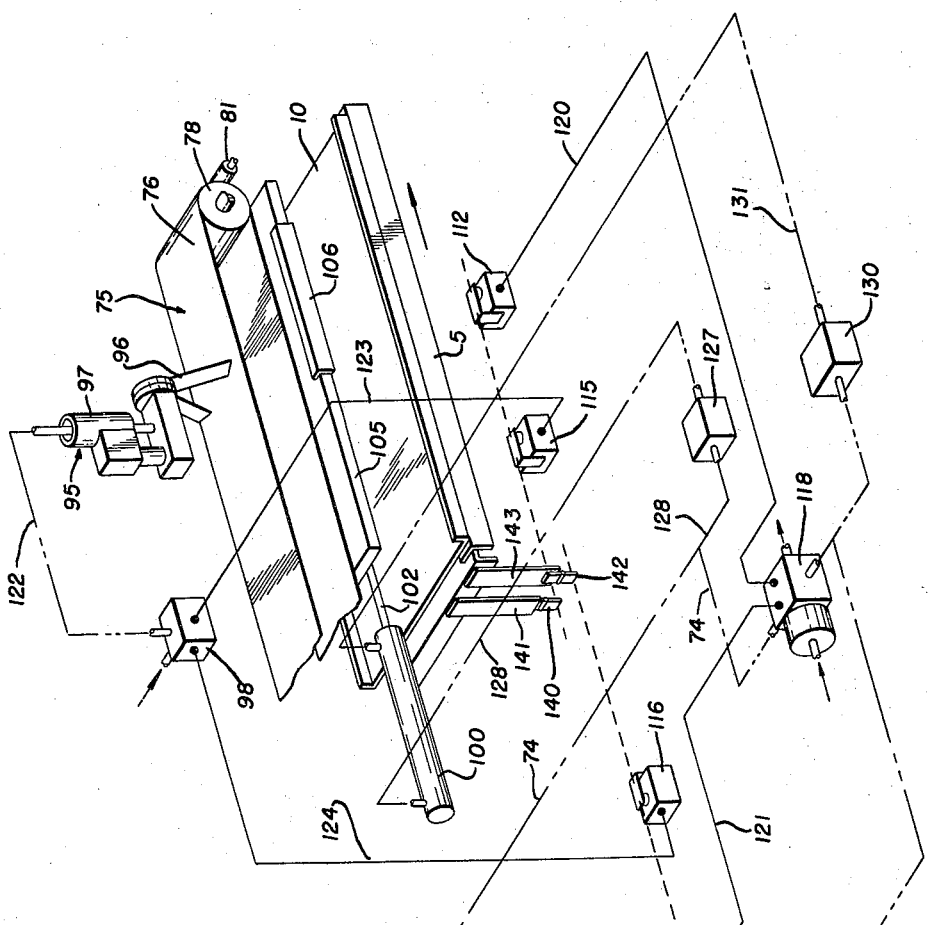
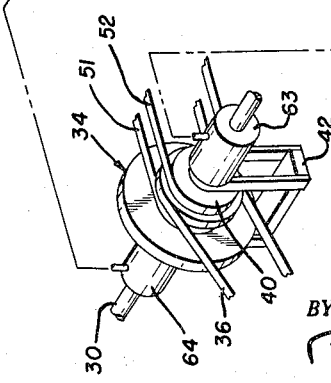
FIG. 16

United States Patent Office 2,949,034
Patented Aug. 16, 1960

2,949,034

CARRIAGE RECIPROCATING MECHANISM

Smith M. Johnson, Pawling, N.Y., and John A. Farmwald, Middlefield, Ohio, assignors to Imperial Manufacturing and Engineering Company, Middlefield, Ohio, a corporation of Michigan Filed June 26, 1956, Ser. No. 593,872

13 Claims. (Cl. 74—37)

The present invention relates, generally, to apparatus for handling linear material, such as the products of extruding machines.

An apparatus similar to the one that constitutes the subject matter of this application is disclosed and claimed in United States Letters Patent No. 2,679,964, issued June 1, 1954, on an application filed by one of the present applicants, John A. Farmwald.

In some respects the present invention consists of specific improvements upon the former apparatus, certain of the objects of the present invention being to generally simplify and better the construction and operation of the apparatus.

Common to the embodiments of the present and predecessor inventions are an elongated supporting frame or structure, a carriage reciprocable therealong that incorporates a receiver or tray for elongate flexible material, means for reciprocating the carriage, and a conveyor that is supported with its discharge end about midway of the length of travel of the carriage, preferably in such manner that the discharge end of the conveyor and the receiver or tray may be relatively moved in a direction transversely of the path of movement of the carriage.

The present apparatus, like the former one, is capable of two modes of operation. One mode of operation is adapted to the handling of extrusions of relatively small and simple cross sections, while the other is suited to the handling of extrusions of larger and more complicated cross sections. In the first mentioned mode of operation, the material is delivered continually from the discharge end of the conveyor directly onto the receiver or tray as the carriage travels to-and-fro at the same speed, the discharge end of the conveyor desirably being moved relative to the receiver, transversely of the latter, so as to lay one convolution of the extrusion after another upon the receiver, the apparatus desirably including a cutting mechanism situated adjacent the discharge end of the conveyor by which the extrusion may be severed into pieces of the desired length or cut to produce a single continuous piece when the tray is loaded. In the other mode of operation, which is adapted to the handling of extrusions of larger and/or more complicated cross sectional designs, the material is transported by the main conveyor and an auxiliary or extension thereof to the receiver or tray during the forward excursions only of the carriage and is cut, incident to the conclusion of each forward excursion, into pieces of the desired length that are laid side by side upon the receiver or tray, the carriage traveling in the reverse direction at a considerably higher speed.

Generally speaking, the first mode of operation was carried out in substantially the same way by both the present and former apparatuses. However, in performing the second mode of operation by means of the earlier apparatus, the carriage was held stationary, a second conveyor was located alongside the carriage to which the extrusions were delivered by the first conveyor, and two men were required, one to sever the material and both to lift the severed pieces from the second conveyor to the receiver or tray of the carriage.

Among the objects of the present invention are to render the apparatus substantially automatic in the performance of the second mode of operation, and to maintain the same rate of output, so to speak, as in the performance of the first mode of operation.

Another related and more specific object of the invention is to provide an auxiliary or extension for the conveyor that will sustain the material as it leaves the conveyor during the time that the carriage is moving in said reverse direction, and that will automatically retract in synchronism with the forward movement of the carriage so as to permit the material to descend upon the receiver or tray as the carriage advances.

Another object of the invention is to provide simple, efficient and reliable mechanism for reciprocating the carriage, and one that operates smoothly when the direction of movement of the carriage is reversed.

A further object is to provide carriage reciprocating mechanism that is readily convertible between two conditions in one of which it moves the carriage in forward and reverse directions at the same speed, and in the other of which it moves the carriage forwardly at substantially the same speed as before, and in reverse direction at a considerably higher speed.

A still further object of the invention is to provide a control system, preferably electrical and pneumatic, for governing the action of the apparatus and for rendering such action automatic, and which includes adjustments that are simple and convenient of manipulation by which the length of travel of the carriage may be varied, and by which the apparatus may be caused to cut the material accurately into pieces of different predetermined lengths.

The foregoing objects and advantages, with others that will appear as this description proceeds, are attained in the embodiment of the invention illustrated in the accompanying drawings, wherein like parts are designated by like reference characters throughout the several views.

In the drawings,

Fig. 1 is a plan view, and Fig. 2 is a side elevational view, of the apparatus of our invention, the views being simple and bordering on the schematic type of illustration;

Fig. 4 is a fragmentary sectional side elevation substantially on the line 4—4 of Fig. 3;

Figure 8:
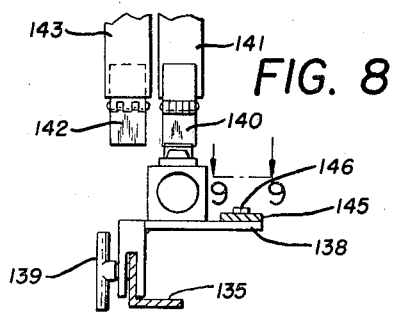
Figure 9:
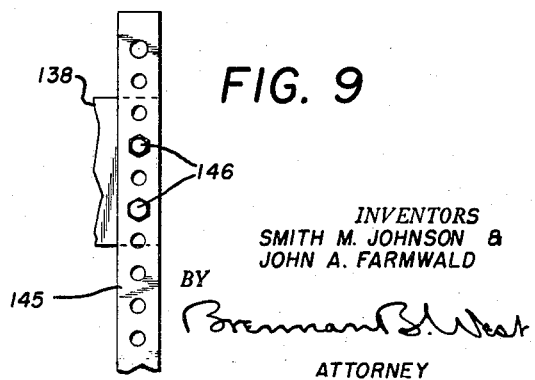
Figure 6:
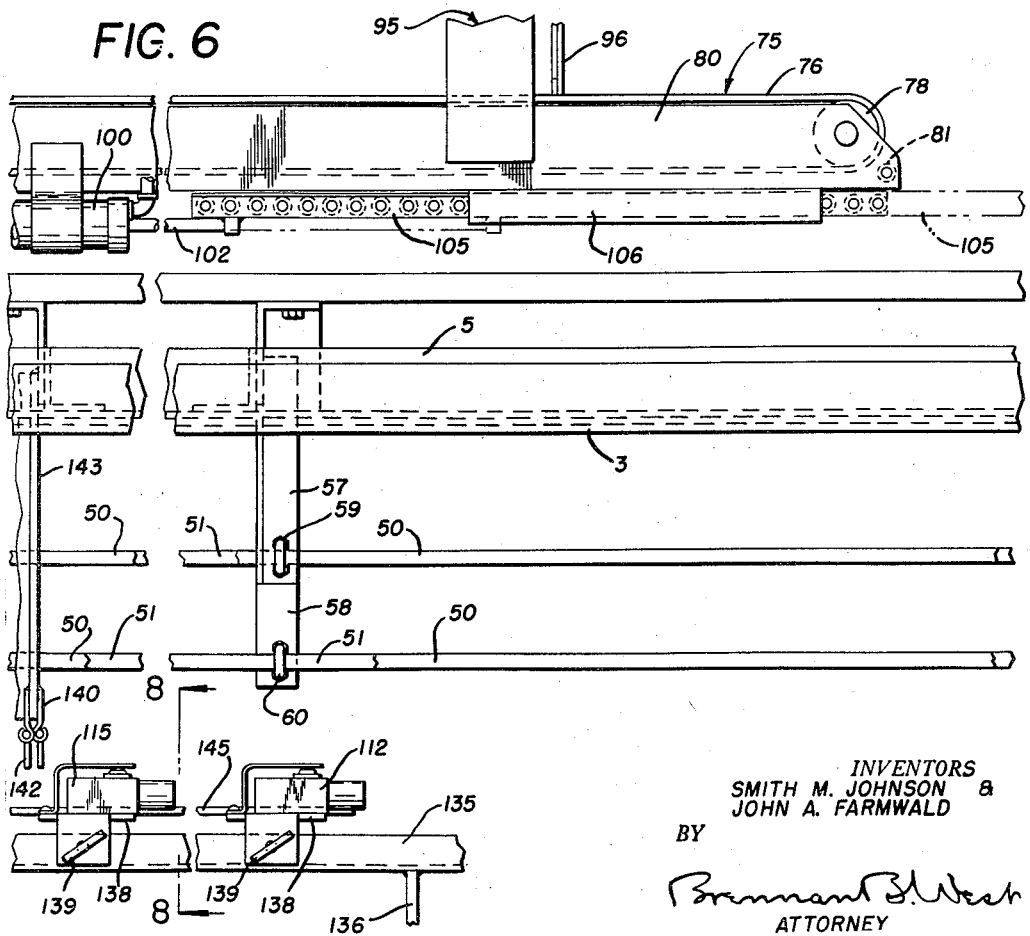
Fig. 6 is an enlarged fragmentary elevational view of the machine as viewed from the line 6—6 of Fig. 1, the view being broken away intermediate its ends and contracted in length, and showing the auxiliary or extension of the conveyor in retracted position in full lines, and projected, in broken lines.
Figure 10:
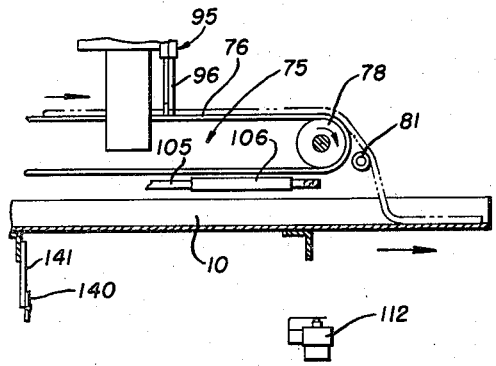
Figure 11:
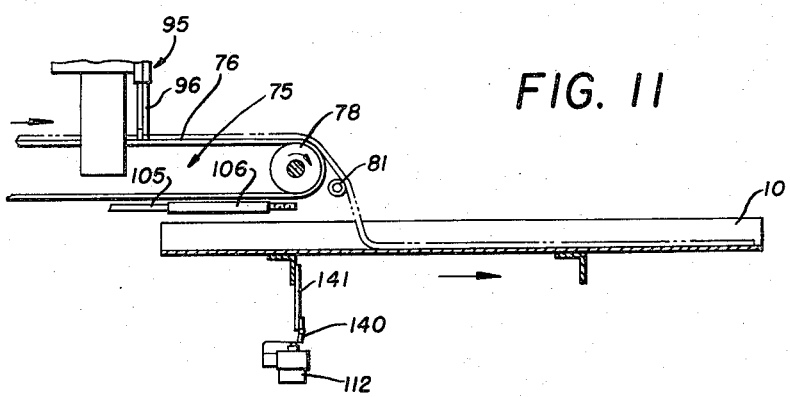
Figure 12:
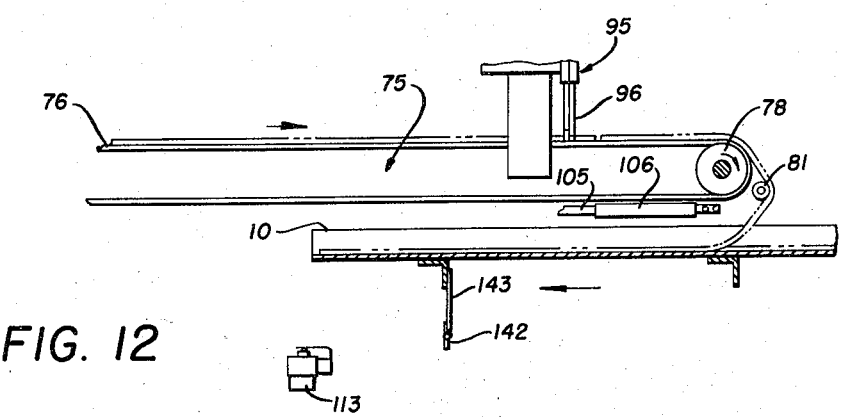

Figs. 8 and 9 (sheet 2) are, respectively, a sectional detail on the line 8—8 of Fig. 6, and a detail as viewed from the line 9—9 of Fig. 8;

Figs. 10, 11 and 12 are schematic views that illustrate the manner in which the linear material is laid upon the receiver or tray in successive convolutions or strips as the carriage reciprocates, according to the first mode of operation of the apparatus;

Figs. 13, 14 and 15 are views similar to Figs. 10 to 12, illustrating phases of the second mode of operation wherein severed pieces of the linear material are laid upon the receiver or tray as the carriage moves forwardly, and wherein the material is temporarily sustained by the auxiliary or extension of the conveyor while the carriage moves in the reverse direction at increased speed, and Fig. 16 is a diagrammatic perspective view showing the essential working parts of the apparatus and the electrical and pressure fluid system by which the operation of the apparatus is controlled and rendered substantially automatic.

The frame of the apparatus, designated generally by the reference numeral 1, is elongated and of rectangular shape, and it is supported a distance above the floor by rollers 2. The top longitudinal corners of the frame 1 are constituted of angle rails 3, and the opposed rails form a track along which a carriage 5 is reciprocable. The carriage is supported from the horizontal flanges of the rails 3 by anti-friction means or rollers 6, while similar means or rollers 7 are incorporated in the carriage for cooperation with the vertical flanges of the rails.

10 designates a receiver or tray incorporated in or supported by the carriage and whereon the linear material is laid during the operation of the apparatus. The receptacle or tray is desirably removable from the carriage so that it may be lifted therefrom and transported to a place of curing, provided the work consists of extrusions of uncured rubber or the like.

Figure 3:
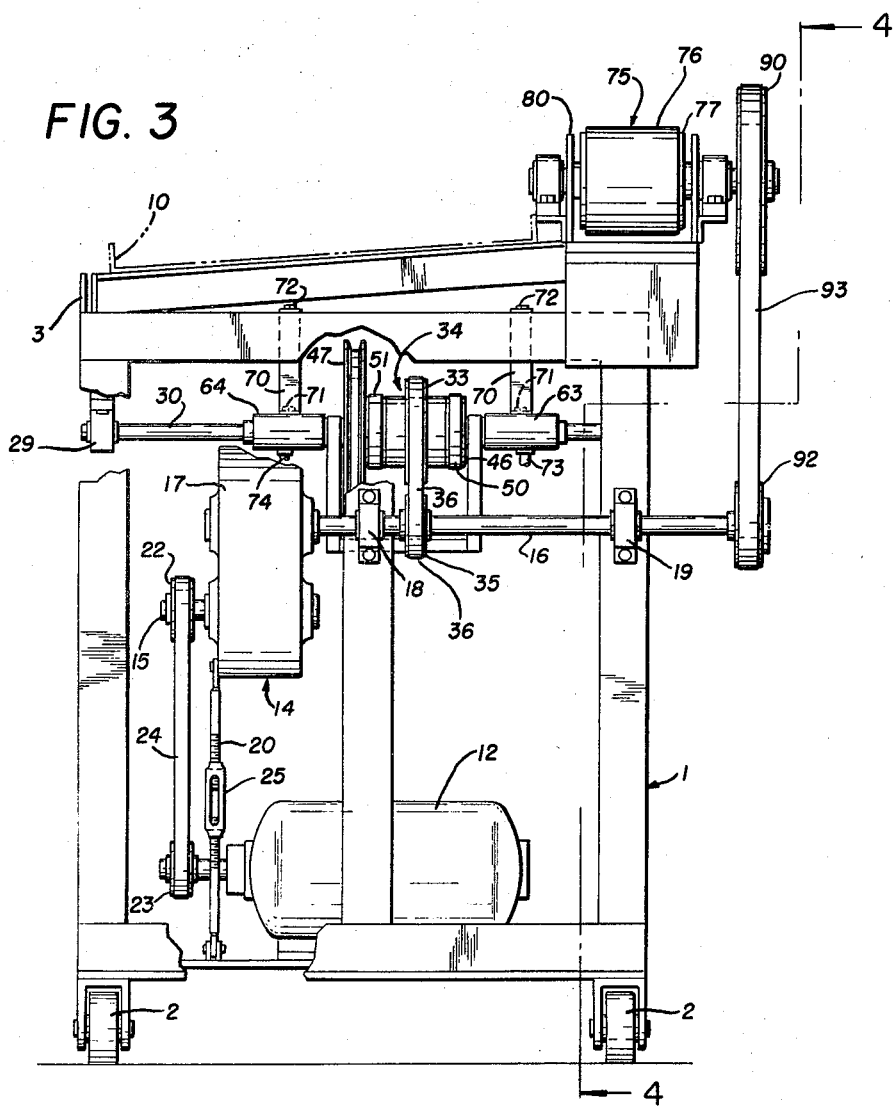
Fig. 3 is an end elevational view of the apparatus, drawn to a scale considerably larger than that of the previous views, the apparatus appearing as though viewed from the left of Figs. 1 and 2, as indicated by the line 3—3 associated with the former view.

Power for reciprocating the carriage is derived from a prime mover or electric motor 12 that is supported within the frame 1, near the lower left hand corner thereof as the apparatus is viewed in Figs. 2 and 4. 14 denotes a conventional power transmitting mechanism including shafts 15 and 16 that are operatively connected by speed reducing gearing (not shown) that is enclosed in the casing 17. As best appears from Fig. 3, the shaft 16 extends forwardly a substantial distance beyond the casing 17 and is journaled in bearings 18 and 19 that are carried by uprights of the frame 1. Thus the power transmitting mechanism 14 is supported solely by the shaft 16, and it is held against swinging about the axis of said shaft by a link 20 which is pivotally connected at one end to the lower portion of the casing 17, and similarly connected at its opposite end to the support for the prime mover or motor 12. The shaft 15 has fixed thereto a pulley 22, and engaged over this pulley, and one designated 23 that is fastened to the shaft of the motor 12, is a belt 24. The previously mentioned link 20 includes a turnbuckle 25 by which the length of the link may be varied, thereby to adjust the casing 17 about the axis of the shaft 16 and alter the tension of the belt 24.

Figure 7:
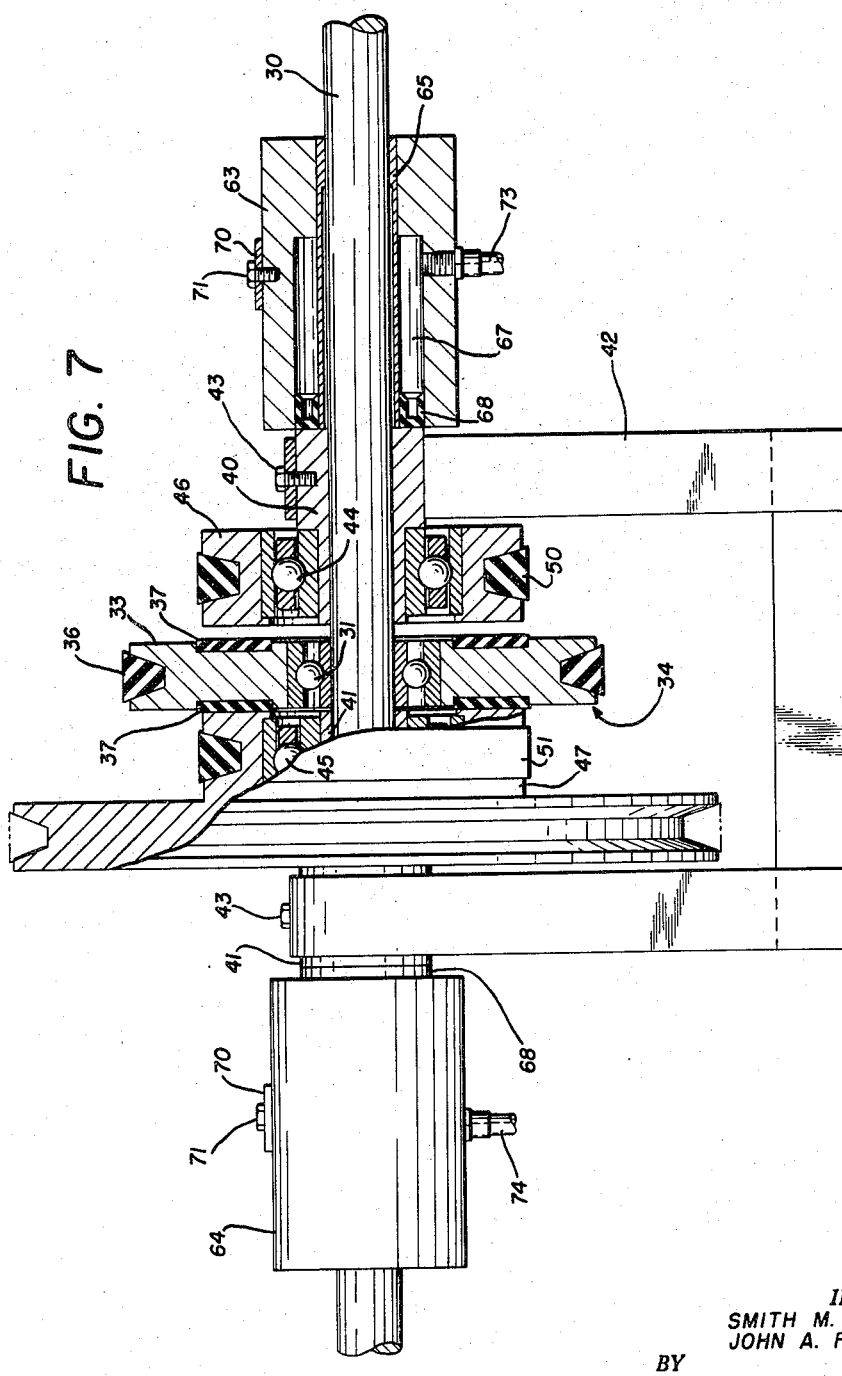
Fig. 7 is an enlarged detail, partly in section, of the friction clutch and pressure fluid devices included in the mechanism for driving the carriage in forward and reverse directions, the plane of section being indicated by the line 7—7 of Fig. 4.

Supported in hangers 28 and 29 that depend from the rails 3 near the left hand end of the frame 1, is a cross bar or shaft 30. Mounted upon this cross bar or shaft 30 (Fig. 7), through an anti-friction bearing 31 in order to insure freedom of rotation, but suitably held against movement longitudinally of the shaft, is a driving member 33 of a clutch generally designated 34. The clutch is desirably of the friction type, and the driving member 33 is shown as a pulley. About the member 33 of the clutch, and a pulley 35 that is mounted upon and secured to the previously mentioned shaft 16, is a belt 36. Shown as inset within the opposite sides of the clutch member 33 are annular friction elements 37. Slidably mounted on the shaft 30, on opposite sides of the clutch member 33, are hubs 40 and 41 that are rigidly connected together by means of a U-shaped frame or yoke 42. The upper ends of the side branches of said yoke embrace the hubs 40 and 41 and are fastened thereto by screws 43. Mounted, through the medium of anti-friction bearings 44 and 45, upon the reduced inner ends of the hubs 40 and 41 are the respective driven clutch members 46 and 47. The driven clutch member 46 is in the form of a single pulley that is somewhat less in diameter than the driving clutch member 33, while the driven clutch member 47 is in the form of a double pulley, the smaller component being of the same size as the member 46, while the other one is considerably greater in diameter than the driving clutch member 33.

Engaged over the driven clutch member 46 is a flexible carriage propelling element or belt 50, and adapted to be engaged over one or the other of the components of driven clutch member 47 is a similar element or belt 51. These belts extend nearly the full length of the frame 1 and are guided over idlers 52 and 53, respectively. These idlers re journaled in yokes 54, carried by screws 55 that are adjustable within an adjacent part of the frame 1. By this means of adjustment, the tension of belts 50 and 51 may be regulated; and when it is desired to engage belt 51 over the larger component of the driven clutch member 47, the corresponding idler 53 may be adjusted inwardly the required distance to compensate for the greater diameter of said larger component.

Figure 5:
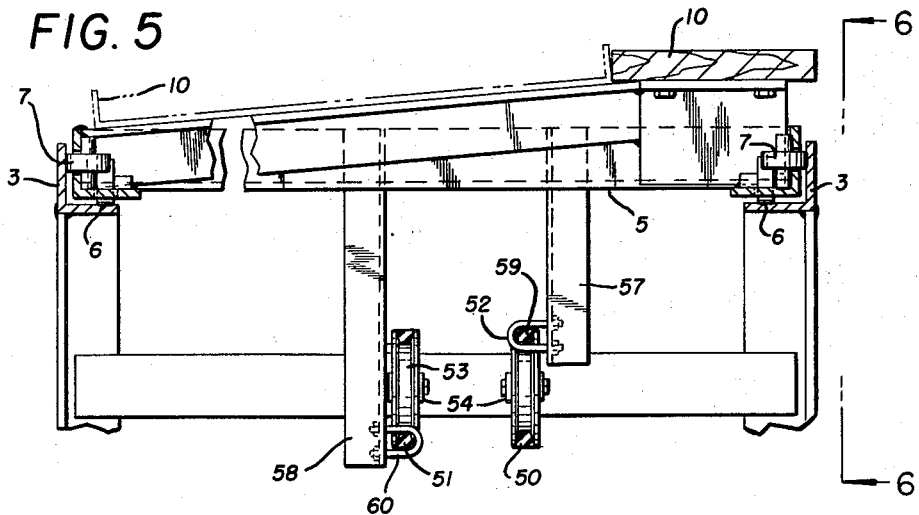
Fig. 5 is a transverse section through the upper part of the machine, as indicated by the line 5—5 of Fig. 4.

Arms 57 and 58 (Fig. 5) are fastened to and depend from the carriage 5, the former alongside the belt 50, and the latter alongside the belt 51. The lower end of the arm 57 is clamped by a U-bolt 59 to the upper flight of the belt 50, and the lower flight of the belt 51 is similarly secured by U-bolt 60 to the lower end of the arm 58.

When the motor 12 is energized the shaft 16 will be driven in a clockwise direction, as viewed in Figs. 2 and 4, thereby to rotate the driving member 33 of the clutch 34 in a corresponding direction through the medium of the belt 36. Consequently, when either of the driven clutch members 46 or 47 is engaged with the driving member 33, the belt 50 or 51 engaged thereover will be driven in the direction indicated by the arrows in Figs. 2 and 4. It follows, therefore, that when the clutch member 46 is being driven the carriage 5 will be propelled forwardly by reason of the fact that the arm 57 of the carriage is clamped to the top flight of the belt 50; and when the clutch member 47 is being driven the carriage will be propelled in the reverse direction because of its being connected through the medium of the arm 58 with the lower flight of the belt 51. It is obvious that while one of the driven clutch members is in frictional engagement with the driving clutch member 33, the corresponding belt will propel the carriage, in a given direction, and that, simultaneously, the other belt and driven clutch member will be caused to idle in the opposite direction due to the connection of said other belt with the carriage.

Mounted upon the cross shaft 30 adjacent the ends of the yoke 42 are pressure fluid devices 63 and 64. These devices are shown as cylindrical bodies that have axial bores within which are fitted the thicker ends of sleeves 65. Said cylindrical bodies are counterbored for a considerable depth at their ends adjacent the yoke 42, to provide annular pressure fluid chambers 67, the inner walls of which chambers are formed by the sleeves 65. Within each annular chamber 67 a ring-like piston 68 operates, the same preferably being made of rubber or pliable plastic. The pistons 68 bear directly against the outer ends of the hubs 40 and 41. The bodies of the devices 63 and 64 are positively held against endwise movement upon the shaft 30, and they are prevented from turning about their axes by straps 70 that are fastened at one end by screws 71 to the devices, and at their opposite ends by screws 72 to a cross member of the frame 1, this feature being best shown in Fig. 3. Pressure fluid is delivered to and conveyed from the chambers 67 of the respective devices 63 and 64 through conduits 73 and 74.

It is evident from the foregoing description that when pressure fluid is admitted to the chamber 67 of the device 63, the piston 68 of said device will be projected less than its length beyond the open end of the chamber and shove the hub 40 along the shaft 30 until the clutch member 46 is firmly engaged with the adjacent friction element 37 of the driving clutch member 33, this movement being transmitted through the yoke 42 to the hub 41, thereby to cause retraction of the piston 68 of the pressure fluid device 64, the chamber of the latter device being vented at this time through the conduit 74. Incidentally, the positions of the parts shown in Fig. 7 resulted from the delivery of pressure fluid to the chamber of the device 64, and simultaneous release of fluid from the chamber of the opposite device 63 through the conduit 73. When the pressure fluid device 63 is energized, as above described, the belt 50 will be driven by the clutch member 46 to move the carriage in the forward direction; and when the device 64 is energized, the belt 51 will be driven by the clutch member 47 to return the carriage. If the return is to be rapid, as in the second mode of operation hereinbefore briefly explained and hereinafter to be more fully described, the belt 51 is shifted from the smaller component of the double pulley clutch member 47, where it is illustrated in the drawings, to the larger component of said clutch member.

75 designates, generally, a belt type conveyor by which the linear material or extrusion that constitutes the work W is transported from the source of supply, such as an extruding machine M (Fig. 2), to the receiver or tray 10. The belt 76 of said conveyor is engaged about a relatively large roller 77 at the receiving end of the conveyor, and about a smaller roller 78 at the discharge end thereof. The upper and lower flights of the conveyor belt 76 are shown as being sustained in parallel relation to each other by a roller 79 that is located adjacent the roller 77. These rollers 77, 78 and 79 are suitably supported for rotation in a frame structure 80, and for a purpose presently to appear, an additional relatively small roller 81 is mounted for free rotation by the forward end of the frame structure in about the plane of the lower flight of the conveyor belt 76. The frame structure 80 is supported adjacent the left hand end of the apparatus through the medium of a bracket 84 that is carried by the frame 1. The said structure 80 is pivotally connected to the bracket by a king bolt 85 which defines a vertical axis about which the conveyor is capable of being swung so that the discharge end thereof may be shifted transversely of the path of movement of the carriage in the distribution of the work upon the receiver or tray 10.

At a suitable location intermediate its ends, the conveyor 75 rests upon a cross member 87 that is fastened to the frame 1 and extends transversely thereof above the path of movement of the carriage 5, the frame structure 80 bearing upon said member and sliding across the same when the conveyor is swung about the axis of the king bolt 85 as above described.

The roller 77 of the conveyor is fixed to a shaft that projects beyond the front of the frame structure 80 where said shaft has secured to it a pulley 90. Over this pulley and a pulley 92 that is fastened to the forward end of the shaft 16 is a belt 93.

Mounted upon the conveyor 75 a suitable distance inwardly from its discharge end is a cutter generally designated 95 for severing the linear material into pieces of desired length as the material is being carried forward by the conveyor belt 76. The cutter 95 preferably consists of the mechanism that constitutes the subject matter of an application, Serial No. 576,491, filed April 5, 1956, by John A. Farmwald, one of the present applicants, jointly with Nelson R. Miller, now Patent No. 2,846,002, dated August 5, 1959. Said cutter involves shear blades 96 that are actuated by pneumatic means including a cylinder 97, and said pneumatic means is under the control of a solenoid valve 98. When the solenoid is energized the valve functions to cause the cutter to operate with an instantaneous action and cut the elongated material or extrusion W by means of the blades 96.

Sustained by and beneath the forward end of the frame structure 80 of the conveyor 75 is a relatively long pressure fluid cylinder 100 within which a piston 101 operates. The rod 102 of the piston has attached to its forward end an auxiliary conveyor or extension 105, which may consist of a conventional roller type conveyor. The auxiliary or extension 105 is reciprocable within guiding means 106, carried by the frame structure 80. When pressure fluid—desirably compressed air—is admitted to the inner end of the cylinder 100 and the opposite end thereof is vented, the piston 101 will be impelled forwardly and, through the rod 102, project the auxiliary or extension 105 beyond the discharge end of the conveyor 75. Conversely, when pressure fluid is admitted to the outer end of the cylinder 100 and the other end thereof is vented, the auxiliary or extension 105 will be retracted.

A source of supply of pressure fluid is provided by a reservoir 110, shown in Fig. 2. This reservoir is kept charged by a compressor or pump (not shown). The delivery of pressure fluid from said source to the pressure fluid devices 63 and 64 through the respective conduits 73 and 74, as well as the venting of said devices through said conduits, is under the control of solenoid valves, as will hereinafter more fully appear. Electric circuits that include the solenoids of the valves associated with the devices 63 and 64, contain the switches 112 and 113, respectively.

The electrical and pressure fluid circuits of the control system hereinbefore referred to, and by which the operation of the apparatus is rendered substantially automatic, may follow conventional engineering practice. Therefore, no attempt has been made herein to represent said circuits further than in the manner shown in Fig. 10, where certain branches of the electrical circuits are represented by solid lines and certain branches of the pressure fluid circuits are represented by broken lines. This view is in the nature of a diagrammatic perspective, and it includes the various switches, solenoid valves, and manual valves by which the apparatus is controlled in the performance of both modes of operation.

Among the switches shown in Fig. 10 are the previously mentioned ones designated 112 and 113, through which reversal of the carriage is effected. Associated with these respective switches are other similar switches 115 and 116. It is through these latter switches that the operation of the cutter 95 is controlled, as will presently appear. The unit designated 118 in Fig. 16 includes two solenoid valves that effect delivery of pressure fluid to and release of fluid from the devices 63 and 64 by which the clutch 34 is actuated. It is thus clear that each of these valves is of the type that delivers the pressure fluid to the line when in one position, and vents said line when in the other position. Also, it is obvious from the context that each valve is positioned to deliver pressure fluid when the solenoid of such valve is energized. Connection of the switches 112 and 113 with the solenoids of the corresponding valves of the unit 118 is through the respective conductors 120 and 121. One of the valves of the unit 118 communicates with the pressure fluid device 63 through the conduit 73, while the other valve of said unit communicates through the conduit 74 with the device 64.

The previously mentioned solenoid valve 98 effects delivery of pressure fluid to, and its escape from, the cylinder 97 of the cutter 95 through a conduit 122. The solenoid of the valve 98 is in circuit with the switches 115 and 116 through the respective conductors 123 and 124. A manually operated valve 127 controls the supply of pressure fluid, through a conduit 128 that branches from the conduit 74, to the rear end of the cylinder 100, while a similar valve 130 controls the flow of pressure fluid through a conduit 131, that branches from the conduit 73, to the front end of the cylinder 100.

We will now describe how the switches 112, 113, 115 and 116 are mounted and actuated. Referring particularly to Figs. 2, 4, 6, 8 and 9, a rail designated 135 is fixedly supported, as by posts 136, within and longitudinally of the frame 1. Each of the switches is carried by a bracket 138 that is mounted upon and is adjustable along the rail 135, and is adapted to be locked in any selected position by a clamping screw 139. The switches 112 and 115 are similarly positioned upon their respective brackets 138 so that said switches are in alignment with each other; but these switches are out of alignment with the aligned switches 113 and 116, as best appears from the diagram of Fig. 10. A hinged actuator 140 is carried by an arm 141 that is attached to and depends from the carriage 5 in alignment with the switches 112 and 115, and a similar actuator 142 is supported in alignment with the switches 113 and 116 by an arm 143 that is also carried by and depends from the carriage 5. As the carriage moves forwardly in the direction of the arrow in Fig. 10, the actuator 140 will wipe over and momentarily close each of the switches 115 and 112, and as the carriage moves in the reverse direction, the hinged actuator 140 will passively drag over said switches and will have no effect upon them. As the carriage continues to move in reverse direction, the actuator 142 will successively engage and close the switches 116 and 113, and in the forward movement of the carriage will drag over and have no effect upon the latter switches.

Since the switches 112 and 113 effect reversal of the carriage, it is evident that the stroke of the carriage, so to speak, or the extent of its travel, may be varied by adjusting the switches along the rail 135. It is also clear that the length of the pieces of linear material that are being cut may be changed, when desired, by shifting the switches 115 and 116 along the rail 135. However, there is usually maintained a given distance between the switches of each pair—that is to say, between switches 112 and 115 on the one hand, and between switches 113 and 116, on the other—since, in the second mode of operation especially, the material is desirably cut to coincide with the reversal of the carriage. When the linear material is to be laid in a continuous piece upon the receiver or tray in reverse convolutions until the receiver or tray is practically filled, according to the first mode of operation, the switches 115 and 116 may be removed from the rail or, at least shifted laterally out of the path of the actuators.

Since, as above mentioned, it is usually desirable to maintain a given relationship between the switches 112 and 115 on the one hand, and between the switches 113 and 116 on the other, the brackets 138 whereon the switches of the respective pairs are mounted are adapted to be tied together through the medium of perforated straps 145, shown in Figs. 2, 6, 8 and 9, the straps being fastened to the brackets by screws 146. By reason of this connection between the switches of each pair, the two pairs may be adjusted along the rail 135 to change the stroke of the carriage, without disturbing the relationship between the switches of each pair.

First mode of operation

In describing the first mode of operation of the apparatus it will be assumed that the material, which is relatively small in cross sectional area and is of simple design, is to be laid in successive convolutions upon the receiver or tray and that it is to be in a continuous piece, which means that it is severed when the tray is filled. Consequently, for this operation, the switches 115 and 116 may be removed from the paths of the actuators 140 and 142; and should it be desired to sever the linear material that is laid in reverse convolutions upon the tray into two or more pieces, obviously the cutter may be actuated by means of a manual switch, for example, at the required intervals.

With the prime mover or electric motor 12 in operation, the driving clutch member 33 will be rotated, as will also the drum 77 of the conveyor 75. Assuming that the clutch 34 is in the condition illustrated in Fig. 7, the carriage 5 will be moved rearwardly until the actuator 142 engages and closes the switch 113, whereupon the corresponding solenoid valve in the unit 118 will be operated to deliver pressure fluid through the conduit 73 to the pressure fluid device 63 and shift the driven members of the clutch so that the member 47 will be released and the member 46 engaged with the driving clutch member 33. This will result in reversal of the carriage and it will now move forwardly until the switch 112 is engaged and closed by the actuator 140, thereby to cause pressure fluid to be delivered to device 64 and return the clutch to its former condition thereby to move the carriage rearwardly.

During this time the linear material or extrusion W will be carried forwardly at a speed corresponding substantially to the speed of the carriage and, as shown in Fig. 10, will run off of the forward end of the conveyor 75 onto the receiver or tray 10 as the carriage moves forwardly in the direction of the arrow associated with the carriage in said view. This action will continue until the switch 112 is engaged and closed by the actuator 140, whereupon the carriage will be reversed and moved in a rearward direction, as indicated by the arrow associated with the carriage in Fig. 12, thereby to lay the next convolution of the extrusion W upon the receiver or tray. To properly distribute the material upon the tray, the operator shifts the discharge end of the conveyor 75 across the receiver or tray, as indicated in dotted lines in Fig. 1. When the tray is filled, the material is severed, as by operation of the cutter 95, and the tray may now be removed from the carriage and taken to a place of curing.

Second mode of operation

As previously explained, the second mode of operation is adapted to the handling of linear material of such cross sectional size and/or shape as to make it impractical or undesirable to fold the material back and forth in successive convolutions, or to deliver it in alternately inverted strips, as it is laid upon the receiver or tray. Therefore, in the present mode of operation, the successive strips are laid side by side in corresponding position upon the receiver or tray as the carriage moves in a forward direction only.

In order to maintain substantially the same rate of output, so to speak, as in the first mode of operation, the carriage is returned at a speed considerably greater than that at which it travels forwardly, the latter being substantially the same as the speed of the conveyor 75 by which the material is transported to the receiver or tray.

Therefore, to condition the machine for the second mode of operation, the idler 53 is moved inwardly by appropriate adjustment of its screw 55 and the belt 51 that is guided thereover is shifted to the larger pulley or component of the clutch member 47. Also, the switches 115 and 116 are properly positioned upon the rail 135 with respect to the switches 112 and 113, and the manual valves 127 and 130 (Fig. 16) are opened, these valves, which control delivery and exhaust of pressure fluid to and from the opposite ends of the cylinder 100, effecting projection and retraction of the conveyor auxiliary or extension 105, said valves 127 and 130 being set so as to effect movement of the auxiliary or extension at the proper speed.

Now, with the apparatus in operation, the linear material or extrusion W is advanced by the conveyor 75 and is laid upon the receiver or tray 10 as the auxiliary or extension 105 retracts and the carriage moves forwardly, Fig. 13 showing the parts in the positions they occupy when the carriage has nearly reached the end of its forward movement. The switch actuator 140, according to said view, has just overridden and momentarily closed the switch 115, thereby to cause the cutter 95 to operate and sever a piece of material. The trailing end of this piece of material descends upon the receiver or tray 10 as the carriage completes its forward movement, such movement terminating with the overriding and actuation of the switch 112 by the actuator 140. The closing of said switch causes energization of the solenoid that actuates the corresponding valve of the unit 118, which valve effects delivery of pressure fluid, through the conduit 74, to the pressure fluid unit 64 and, simultaneously, through the conduit 128 to the rear end of the cylinder 100.

Under these circumstances, the driven clutch member 47 will be engaged with the driving clutch member 33 and the corresponding carriage propelling element or belt 51 will be operated at relatively high speed to effect quick return movement of the carriage. At the same time the conveyor auxiliary or extension 105 will be projected, as indicated by the arrow associated with said part in Fig. 14, thereby to temporarily support the advancing end of the linear material or extrusion W while the carriage moves rearwardly as indicated by the arrow associated with the carriage in Fig. 14. As the carriage continues to move rearwardly, the auxiliary or extension 105 will proceed forwardly to sustain the material until the carriage again starts forwardly. When this occurs, and as soon as the advancing end of the receiving or tray moves under the corresponding end of the extension 105, said extension will start to retract, allowing the material to be laid upon the receiver or tray as the carriage continues to advance at the speed of advancement of the linear material. The auxiliary or extension 105, as hereinbefore pointed out, is desirably in the nature of a roller conveyor. Accordingly, the material tends to drop over the forward end of the extension as the extension retracts, and the roller 81 overcomes any tendency of the material to follow the extension as the latter is retracted.

While we have referred herein to belts and pulleys, it is to be understood that these terms embrace all reasonable equivalents, such as sprocket chains or other flexible driving elements, and sprocket wheels or other appropriate devices; and the present embodiment of the invention is to be taken as illustrative, rather than as limiting, the same being susceptible to such changes and modifications as fall within the scope of the claims appended hereto.

Having thus described our invention, what we claim is:

1. In apparatus of the character described, two endless belts, a member driven by said belts, means by which the belts are sustained adjacent and substantially parallel to the path of movement of said member, a continuously prevailing connection between the member and one flight of one belt, a similar connection between the member and the opposite flight of the other belt, and mechanism for actively driving each of said belts in a given direction in alternation with the other belt and while said other belt is caused to travel in the opposite direction by reason of its connection with the member.

2. In apparatus of the character described, a rotatable driving member, means rotating the same in a given direction, two rotatable driven members, mechanism for effecting driving connection between the driving member and each of the driven members in alternation for positively rotating one driven member in the same direction as the driving member while the other driven member is free to rotate in the opposite direction, a pulley rotatable with each driven member, two endless belts, one belt engaged over each pulley, a reciprocating member driven by said belts, guide means by which the belts are sustained adjacent and substantially parallel to the path of movement of said reciprocating member, a connection between said reciprocating member and one flight of one belt, and a connection between the reciprocating member and the opposite flight of the other belt.

3. In apparatus of the character described, a rotatable driving member, means rotating the same in a given direction, two rotatable driven members, mechanism for effecting driving connection between the driving member and each of the driven members in alternation for positively rotating one driven member in the same direction as the driving member while the other driven member is free to rotate in the opposite direction, a pulley rotatable with each driven member, two endless belts, one engaged with each pulley, a reciprocating member driven by said belts, guide means by which the belts are sustained adjacent and substantially parallel to the path of movement of said reciprocating member, a connection between said reciprocating member and one flight of one belt, a connection between the reciprocating member and the opposite flight of the other belt, and two instrumentalities, one rendered active when the reciprocating member is at one end of its travel and the other rendered active when the reciprocating member is at the opposite end of its travel, for causing the aforesaid mechanism to effect driving connection between the driving member and first one and then the other of the driven members.

4. In apparatus of the character described, a rotatable driving member, means rotating the same in a given direction, two rotatable driven members, mechanism for effecting driving connection between the driving member and each of the driven members in alternation for positively rotating one driven member in the same direction as the driving member while the other driven member is free to rotate in the opposite direction, a pulley rotatable with each driven member, two endless belts, one engaged with each pulley, a reciprocating member driven by said belts, guide means by which the belts are sustained adjacent and substantially parallel to the path of movement of said reciprocating member, a connection between said reciprocating member and one flight of one belt, a connection between the reciprocating member and the opposite flight of the other belt, a pair of devices consisting of two instrumentalities, another pair of devices consisting of two actuators, one actuator for rendering the first instrumentality effective by cooperation therewith when the reciprocating member is at one end of its travel and the other for rendering the second instrumentality effective in similar manner when the reciprocating member is at the opposite end of its travel, said instrumentalities causing the aforesaid mechanism to effect driving connection between the driving member and first one and then the other of the driven members, one pair of said devices being movable with the reciprocating member and the other sustained by the supporting structure.

5. In apparatus of the character described, as set forth in claim 4, wherein the two pairs of devices are relatively adjustable in the general direction of movement of the reciprocating member whereby the range of reciprocation of the reciprocating member may be altered.

6. In apparatus of the character described, a friction clutch comprising a rotatable driving member and two rotatable driven members, means rotating the driving member in a given direction, pressure fluid means for effecting frictional engagement between the driving member and each of the driven members in alternation for rotating one driven member in the same direction as the driving member while the other driven member is free to rotate in the opposite direction, a pulley rotatable with each driven member, two endless belts, one of said belts engaged over each pulley, a member movable in opposite directions, means for moving said member in opposite directions, guide means by which the belts are sustained adjacent and substantially parallel to the path of movement of the movable member, a connection between the movable member and one flight of one belt, and a connection between the movable member and the opposite flight of the other belt.

7. In apparatus of the character described, a clutch comprising a driving member, and two driven members disposed on opposite sides of the driving member, all of said members being supported for rotation about a common axis, a yoke connecting the driven members and spacing them apart so that the driven members and yoke are movable as a unit along said axis for effecting driving connection between one or the other of the driven members and the driving member, power means for so moving the unit comprised of the yoke and driven members, means for rotating the driving member in a given direction, a pulley incorporated in each of the driven members, two endless belts, one engaged with each pulley, a member movable in reverse directions, means sustaining the belts adjacent and substantially parallel to the path of movement of the said movable member, a connection between the movable member and one flight of one belt, a connection between the said member and the opposite flight of the other belt, and means effecting operation of said power means in synchronism with the reciprocation of the last named member.

8. In apparatus of the character described, a friction clutch comprising a driving member having opposed friction faces, and two driven members on opposite sides of the driving member having friction faces for engagement with those of the driving member, a yoke connecting together and spacing apart said driven members so that the friction faces thereof are spaced further apart than the friction faces of the driving member, the clutch members being supported for rotation about a common axis, pressure fluid devices substantially aligned with said axis outwardly beyond the driven clutch members, each being adapted to urge the adjacent driven member in a direction to engage its face with the corresponding face of the driving clutch member, means for rotating the driving clutch member in a given direction, a pulley incorporated in each driven clutch member, two endless belts, one engaged over each pulley, a member movable in opposite directions, guide means sustaining said belts adjacent and substantially parallel to the path of movement of the last named member, fluid conveying means for conducting pressure fluid to said pressure fluid devices, valves in said fluid conveying means for controlling the delivery of pressure fluid to the respective devices, electrical actuators for said valves, electric switches, circuits including said switches and said actuators, and means operating in synchronism with the movements of the last named member for closing first one and then the other of said switches.

9. In apparatus of the character described, a friction clutch comprising a driving member having opposed friction faces, and two driven members on opposite sides of the driving member having friction faces for engagement with those of the driving member, a yoke connecting together and spacing apart said driven members so that the friction faces thereof are spaced further apart than the friction faces of the driving member, the clutch members being supported for rotation about a common axis, pressure fluid devices substantially aligned with said axis outwardly beyond the driven clutch members, each being adapted to urge the adjacent driven member in a direction to engage its face with the corresponding face of the driving clutch member, means for rotating the driving clutch member in a given direction, a pulley incorporated in one of the driven clutch members, two pulleys of different diameters incorporated in the other driven clutch member, an endless belt engaged with the pulley of the first mentioned driven clutch member, a second endless belt for engagement with one or the other of the pulleys of the other driven clutch member, a member movable in opposite directions by said belts, guide means sustaining said belts adjacent and substantially parallel to the path of movement of the last named member, fluid conveying means for conducting pressure fluid to said pressure fluid devices, valves in said fluid conveying means for controlling the delivery of pressure fluid to the respective devices, electrical actuators for said valves, electric switches, circuits including said switches and said actuators, and means operating in synchronism with the movements of the movable member for closing first one and then the other of said switches.

10. In apparatus of the character described, a clutch comprising a driving member having oppositely facing axial clutch faces and two driven clutch members on opposite sides of the driving member, each having a clutch face for cooperation with one of the clutch faces of the driving member, the clutch members being mounted upon a shaft and rotatable about the axis thereof, means for rotating the driving member in a given direction, a yoke connecting together and spacing apart said driven members with their faces spaced further apart than the faces of the driving clutch member, a pressure fluid device mounted upon said shaft outwardly beyond each of the driven clutch members, said devices being anchored to the supporting structure so as to be held in substantially fixed relation thereto, each device being characterized by a pressure chamber surrounding the shaft, an annular piston in each chamber operatively associated with the adjacent driven clutch member whereby the latter may be urged in a direction to engage its clutch face with the corresponding clutch face of the driving member when pressure fluid is admitted to the chamber, fluid conveying means for delivering pressure fluid to the chamber of each device, a valve therein for governing the delivery of pressure fluid to said chamber, an electrical actuator for each valve, an electric switch corresponding to each actuator, an electric circuit including each actuator and the corresponding switch, a reciprocating member, means for actuating said switches in alternation and in synchronism with the reciprocation of the last named member, a pulley incorporated in each of the driven clutch members, two endless belts, one engaged with the pulley of each driven clutch member, means sustaining the belts adjacent and parallel to the path of movement of the reciprocating member, a connection between the said member and one flight of one belt, and a connection between the said member and the opposite flight of the other belt.

11. In apparatus of the character described, a reciprocating member, power means for reciprocating the said member, said power means including two separate and distinct impelling mechanisms for actuating said reciprocating member, one for moving the said member in one direction, and the other for moving the said member in the opposite direction at the same rate as that of the movement of the member in said one direction, two controls therefor spaced apart along the path of movement of the member, each of said controls being individual to a respective one of said mechanisms for effecting reversal of the member when said controls are alternately actuated, and means movable with the member for actuating said controls.

12. In apparatus of the character described as set forth in claim 11, wherein said controls are adjustable toward and from each other thereby to alter the range of reciprocation of the member.

13. In apparatus of the character described, a reciprocating member, power means for reciprocating the said member, said power means including two separate and distinct impelling mechanisms for actuating said reciprocating member, one for moving the said member in one direction, and the other for moving the said member in the opposite direction at the same rate as that of the movement of the member in said one direction, two controls therefor spaced apart along the path of movement of the member, each of said controls being individual to a respective one of said mechanisms for effecting reversal of the member when said controls are alternately actuated, means movable with the member for actuating said controls, and selective means on one of said impelling mechanisms whereby the said member may be impelled in one direction at a higher rate of movement than that in an opposite direction.

References Cited in the file of this patent

UNITED STATES PATENTS

| | | |
|---|---|---|
| 1,014,706 | Houghton | Jan. 16, 1912 |
| 1,077,815 | Droitcour | Nov. 4, 1913 |
| 1,376,969 | Pelton | May 3, 1921 |
| 1,418,714 | Humphries | June 6, 1922 |
| 1,605,991 | Shields | Nov. 9, 1926 |
| 2,415,233 | Brustowsky | Feb. 4, 1947 |
| 2,441,854 | Stolp | May 18, 1948 |
| 2,517,546 | Deakin | Aug. 8, 1950 |
| 2,523,231 | Pianta | Sept. 19, 1950 |
| 2,608,699 | Csencsics | Sept. 2, 1952 |
| 2,679,964 | Farmwald | June 1, 1954 |
| 2,747,649 | Reed | May 29, 1956 |

FOREIGN PATENTS

| | | |
|---|---|---|
| 1,033,106 | France | Apr. 1, 1953 |